United States Patent [19]

Johnson

[11] 4,241,345
[45] Dec. 23, 1980

[54] PULSE RADAR TRANSMITTING OSCILLATOR
[75] Inventor: Henry C. Johnson, Neshanic, N.J.
[73] Assignee: RCA Corporation, New York, N.Y.
[21] Appl. No.: 44,177
[22] Filed: May 31, 1979
[51] Int. Cl.³ .............................................. G01S 7/02
[52] U.S. Cl. ............................... 343/5 SW; 343/7 PL
[58] Field of Search ............ 343/5 TM, 55 W, 7 PL; 325/433 (U.S. only), 144 (U.S. only)

[56] References Cited
U.S. PATENT DOCUMENTS
3,706,048 12/1972 Johnston ........................ 325/433 X
4,176,351 11/1979 De Vita et al. ................ 343/7 PL X Primary Examiner—Malcolm F. Hubler
Attorney, Agent, or Firm—Samuel Cohen; Robert L. Troike; Raymond E. Smiley

[57] ABSTRACT

An oscillator circuit for use in a pulsed radar transmitter includes a reference oscillator of one frequency of, a voltage controlled oscillator controlled to transmit a radio frequency at a different frequency, and a switch for connecting the two oscillators together to inject lock the voltage controlled oscillator to the frequency of the reference oscillator when no transmitting is occurring.

10 Claims, 3 Drawing Figures

PULSE RADAR TRANSMITTING OSCILLATOR

In the prior art, a pulsed radar system has utilized a magnetron as the radio frequency (RF) pulse producing element. The magnetron responds to a high voltage bias pulse by producing a high power transmitting signal at some preselected frequency and ideally either produces that frequency without changes in frequency as the magnetron is turned on and off or, when no bias pulse is present, produces no frequency. Magnetrons come close to the ideal. They are, however, bulky, heavy and costly when compared to modern solid-state technology. It is therefore desirable to utilize a solid-state transmitting oscillator circuit. Such a circuit should, like the magnetron, produce only the desired frequency when pulsed and no frequency or at least not the preselected frequency when turned "off." Such solid-state type oscillators undesirably exhibit wide frequency excursions upon turn-on. If the oscillator remains on continuously, signals produced by the oscillator tend to mask very weak radar return signals in a radar system utilizing the solid-state oscillator thus reducing substantially the sensitivity of the system.

In accordance with the present invention, a first reference oscillator produces a frequency $f_1$. A second oscillator normally produces a different frequency $f_2$ but is responsive to the application of $f_1$ from the first reference oscillator for producing frequency $f_1$. A transmitting means is responsive to frequency $f_2$ for transmitting $f_2$. Means responsive to a source of spaced-apart pulses connects the first oscillator to the second oscillator only when said spaced apart pulses are not present.

Figure 1:
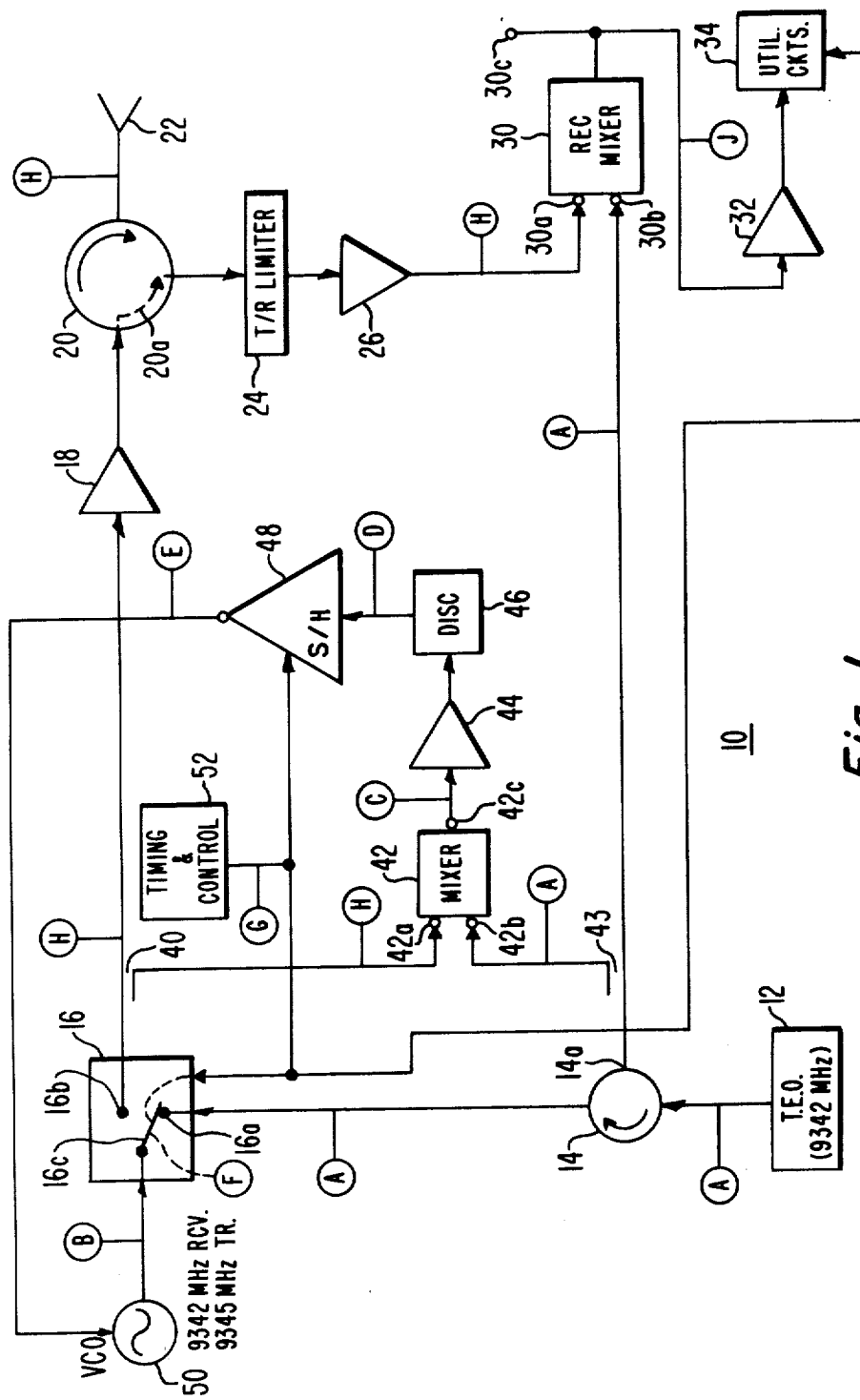
FIG. 1 is one embodiment of the transmitting and receiving portion of a pulsed radar system in block diagram form including the transmitting oscillator circuitry.
Figure 3:
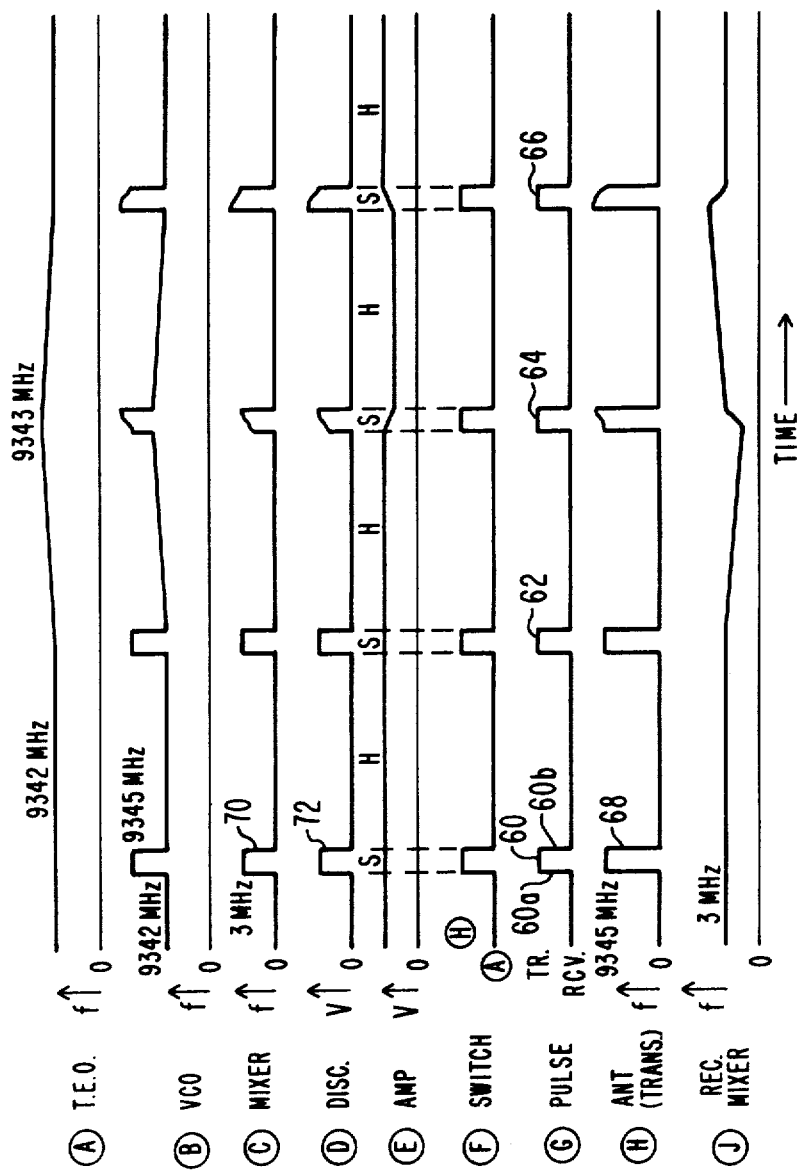
FIG. 3 is a set of waveforms useful in understanding the operation of the FIGS. 1 and 2 circuits.

Refer to FIG. 1 where encircled letters at various points in the figure correspond to similarly legended waveforms in FIG. 3. FIG. 1 is a block diagram of a pulse radar transmitter and receiver 10 such as utilized for airborne weather radar systems. A reference oscillator 12 such as a transferred electron oscillator produces a nominal frequency $f_1$ such as, for example, 9342 MHz. The oscillator is subject to slight variations in frequency which are compensated by the system as will be described hereinafter. Oscillator 12 is coupled to a circulator 14 which is coupled to terminal 16a of an electronic single pole double throw switch 16. A second terminal 16b of switch 16 is coupled to a radio frequency (RF) power amplifier 18. Amplifier 18 is coupled to a circulator 20 sometimes referred to as a duplexer. Circulator 20 is coupled to a transmit and receive antenna 22 of conventional design for transmitting RF pulses into the atmosphere and receiving reference return signals thereform.

RF signals returned to antenna 22 are passed by circulator 20 to a transmit/receive limiter 24 coupled to circulator 20. Limiter 24 is coupled to an RF amplifier 26. The purpose of limiter 24 is to prevent high powered signals produced by amplifier 18 and leaked via path 20a of circulator 20 from damaging amplifier 26. Amplifier 26 is coupled to an input terminal 30a of a frequency substractive mixer or a low pass mixer 30. Mixer 30 is typically an image reject or double balanced mixer.

Circulator 14 at port 14a is coupled to the second input terminal 30b of mixer 30 for passing signals present at terminal 16a to the mixer. Mixer 30 produces at terminal 30c signals which are the difference in frequency between those applied to the mixer at terminal 30a and terminal 30b. That is, mixer 30 produces signals which are termed intermediate frequencies (IF). Terminal 30c is coupled to an intermediate frequency amplifier 32 which is in turn coupled to utilization circuits 34. Circuits 34 may be for example a weather radar circuit for detecting and displaying storm intensities corresponding to signals received at antenna 22 from various points in the atmosphere.

A coupler 40 couples a portion of the signals appearing at terminal 16b to one input terminal 42a of mixer, 42, which may be a single diode type mixer. A coupler 43 couples a portion of the signals appearing at port 14a to another input terminal 42b of mixer 42. Mixer 42 produces at its output terminal 42c a frequency which is the difference of the frequencies applied to terminals 42a and 42b. The difference of IF signal appearing at terminal 42c is amplified by an amplifier 44 and passed to a frequency-to-voltage discriminator 46. Discriminator 46 produces a voltage which is a function of the frequency produced by mixer 42. Discriminator 46 is coupled to a sample-and-hold circuit (S/H) 48. The inverting output terminal of S/H 48 is coupled to the control terminal of a second oscillator 50. As will be described hereinafter, S/H 48 is of the type which produces for higher input voltages a relatively lower output voltage and produces for relatively lower input voltage a relatively higher output voltage. Oscillator 50 is typically a voltage controlled oscillator which responds to the voltage signals received from circuit 48 to produce a corresponding output frequency which is applied to switch arm 16c of switch 16 producing an increasing frequency for increasing control voltage. The voltage produced at circuit 48 is such that VCO 50 produces a frequency, $f_2$ of, for example, 9345 MHz. Relative to the power of oscillator 12, the power of oscillator 50 is greater by, for example, a factor of ten.

The position of switch arm 16c is determined by a timing and control circuit (T/C) 52 which is also coupled to S/H 48 to determine whether circuit 48 is sampling the signal produced by discriminator 46 or holding the signal previously sampled. T/C 52 is also coupled to utilization circuit 34 to control the response to signals from amplifier 32. T/C 52, which may be a crystal oscillator having a frequency digitally stepped down to desired values in conventional manner, produces a series of spaced-apart pulses. For example it may produce 200 pulses per second, each pulse being of pulse width or pulse time duration of 10 microseconds.

Switch arm 16c is responsive to the presence of pulses from circuit 52 to be positioned to terminal 16b and responsive to the absence of such pulses to be positioned to terminal 16a. S/H 48 is responsive to the presence of pulses for sampling signals received from discriminator 46 and responsive to the absence of pulses for holding signals so received. Referring momentarily to waveform G, FIG. 3, pulses 60, 62, 64 and 66 produced by circuit 52 are illustrated as a function of time. Neither waveform G nor any of the other waveforms in FIG. 3 are drawn to scale either as to ordinate or abscissa. The waveforms of FIG. 3 are intended to be used only as an aid in understanding the operation of the circuit in FIG. 1 which will now be described.

The circuit of FIG. 1 is either in the transmit mode or the receive mode. It will be initially assumed to be in the transmit mode. Oscillator 12 is initially assumed to produce a radio frequency signal of given value such as 9342 MHz. Further, it will be assumed that S/H 48 produces a voltage such that oscillator 50 produces a frequency $f_2$ of 9345 MHz. It will be additionally assumed that a 10 microsecond pulse (pulse 60, FIG. 3, waveform G, hereinafter, waveform G-60) is present indicative of a transmitting mode so that arm 16c is positioned to terminal 16b and S/H 48 is sampling voltage from discriminator 46. Therefore, antenna 22 transmits into the atmosphere a 10 microsecond pulse of 9345 MHz as illustrated by waveform H-68. Mixer 42 receives at terminals 42a and 42b signals of frequency 9345 and 9342 MHz respectively and therefore produces at the terminal 42c an IF signal of 3 MHz as illustrated in waveform C-70. Discriminator 46 converts the 3 MHz pulse to an appropriate voltage (waveform D-72) which is sampled by S/H 48 under control of T/C 52. The letter "S" at various places along waveform E, FIG. 3, indicates times when S/H 48 is supplying voltage produced by discriminator 46 while the letter "H" identifies times when S/H 48 is holding a previously sampled voltage.

When the signal supplied at terminals 42a and 42b are 3 MHz apart, S/H 48 produces a voltage which causes oscillator 50 to produce a frequency 3 MHz above that produced at oscillator 12 or, in the example, 9345 MHz.

During the time pulse 60 (waveform G-60) is present, and therefore an RF signal is applied at amplifier 18 the RF signal is passed in the reverse direction as indicated by dashed arrow 20a around circulator 20 through limiter 24 and amplifier 26 to terminal 30a of mixer 30. Mixer 30 also receives a signal simultaneously from oscillator 12 via circulator 14. Mixer 30 therefore produces an IF signal at terminal 30c. Since utilization circuit 34 is disabled by pulse G-60, no action is taken upon the IF signal at this time. At the trailing edge G-60b of pulse G-60 which marks the changeover from transmit mode to receive mode three events occur: (1) switch arm 16c is positioned to terminal 16a, (2) S/H 48 holds the voltage previously received from discriminator 46, (3) utilization circuits 34 are made active.

When switch arm 16c is connected to terminal 16a, oscillator 12 is connected to oscillator 50 through circulator 14 as illustrated in FIG. 1. When the two oscillators are connected together, the frequency of oscillator 50 becomes injection locked to the frequency of oscillator 12 such that oscillator 50 produces the same frequency, 9342 MHz, as oscillator 12 and not the frequency which would result from the control voltage applied to oscillator 50. Conversely, the frequency of oscillator 12 is not locked to that of oscillator 50 since oscillator 12 is isolated from oscillator 50 by circulator 14. The shift in frequency from 9345 MHz and 9342 MHz occurs in approximately one RF cycle. That is, approximately one cycle after arm 16c is positioned to terminal 16a no transmitting frequency signal is present in the circuit of FIG. 1 except the signal returned to antenna 22 from the atmosphere. Further, because arm 16c is not connected to terminal 16b no power is transmitting through antenna 22. It will be understood in those applications in which the system design requirements can tolerate a transmitting frequency different in frequency from the frequency transmitted in the transmit mode, switch 16 can be a single pole single throw switch having only arm 16c and terminal 16a. In such an arrangement terminal 16b is connected electrically to arm 16c by means of an appropriate circulator. With switch 16 as shown no frequency is present at terminal 16b during the receive mode and therefore no frequency is present at terminal 42a of mixer 42. Mixer 42 is thus receiving 9342 MHz at terminal 42b and being a low pass mixer produces no frequency at terminal 42c. Thus, no voltage is produced by discriminator 46. The lack of voltage is of no consequence as S/H 48 is disabled from sampling input voltage by the lack of a pulse from T/C 52. During the receive mode return signals at 9345 MHz to antenna 22 are routed by circulator 20 through limiter 24 and amplifier 26 to terminal 30a of mixer 30. Mixer 30 is also receptive at terminal 30b of a 9342 MHz signal from reference oscillator 50. Mixer 30 thus produces a 3 MHz IF signal which is processed by utilization circuits 34. It will be appreciated that the power requirement of mixer 30 may be greater than the power supplied by oscillator 12. However, the power availability of oscillator 50, frequency locked to oscillator 12, is sufficient to supply the power needs of mixer 30. It will be noted that in the receive mode the only 3 MHz signal present is that from mixer 30. No 3 MHz signal is produced by mixer 42 during the receive mode. Such a signal would be undesirable in that, if coupled to mixer 30 and the circuits therefollowing, would be treated as undesirable noise.

Upon generation of the next pulse 62 (waveform G-62) by T/C 52, switch arm 16c is reconnected to terminal 16b disconnecting oscillator 12 from oscillator 50. The control voltage applied from S/H 48 to oscillator 50 causes the oscillator to become stable and produce 9345 MHz within òne RF cycle after oscillator 50 is disconnected from oscillator 12. Due to the presence of pulse 62, mixer 42 continues to produce 3 MHz which causes S/H 48 to produce a voltage to maintain oscillator 50 at 9345 MHz.

If for some reason oscillator 50 goes up in frequency, mixer 42 will produce a signal of greater frequency than 3 MHz, the voltage in discriminator 46 will rise accordingly and the voltage from S/H 48 will decrease accordingly causing the frequency of VCO 50 to decrease. Conversely, if the frequency of VCO 50 decreases for some reason the frequency from mixer 42 will also decrease and the voltage from S/H 48 will increase causing an increase in the voltage applied to oscillator 50 and an increase in its output frequency.

The frequency of reference oscillator 12 may also drift up or down. The circuit illustrated in FIG. 1 will follow such drifts. For example, an upward drift of 1 MHz followed by a downward drift of 1 MHz by oscillator 12 is illustrated in FIG. 3. It will be realized that a drift of 1 MHz in one cycle of T/C 52 pulses would not occur in a practical circuit but is shown for purposes of illustration only. The 1 MHz drift of oscillator 12 is illustrated as occurring between pulses 62 and 64 of T/C 52 while a downward drift of 1 MHz back to 9342 MHz is illustrated as occurring between pulses 64 and 66. Therefore when pulse 64 occurs oscillator 12 is producing 9343 MHz and oscillator 50 is producing 9345 MHz. Mixer 42 thus produces a difference signal of 2 MHz which is translated by discriminator 46 to a decrease in voltage signal and by S/H 48 to an increase in voltage signal to increase a frequency of oscillator 50 to 9346 MHz, thus maintaining a 3 MHz separation between oscillator 50 and oscillator 12. When pulse 66 occurs oscillator 12 has returned to a frequency of 9342 MHz but the voltage produced by S/H 48 will initially cause oscillator 50 to produce 9346 MHz resulting in a 4 MHz difference signal being produced by mixer 42 with a result in decrease in signal produced by S/H 48 and a decrease in frequency of oscillator 50 back to 9345 MHz thus oscillator 50 continues to follow oscillator 12 in frequency.

Figure 2:
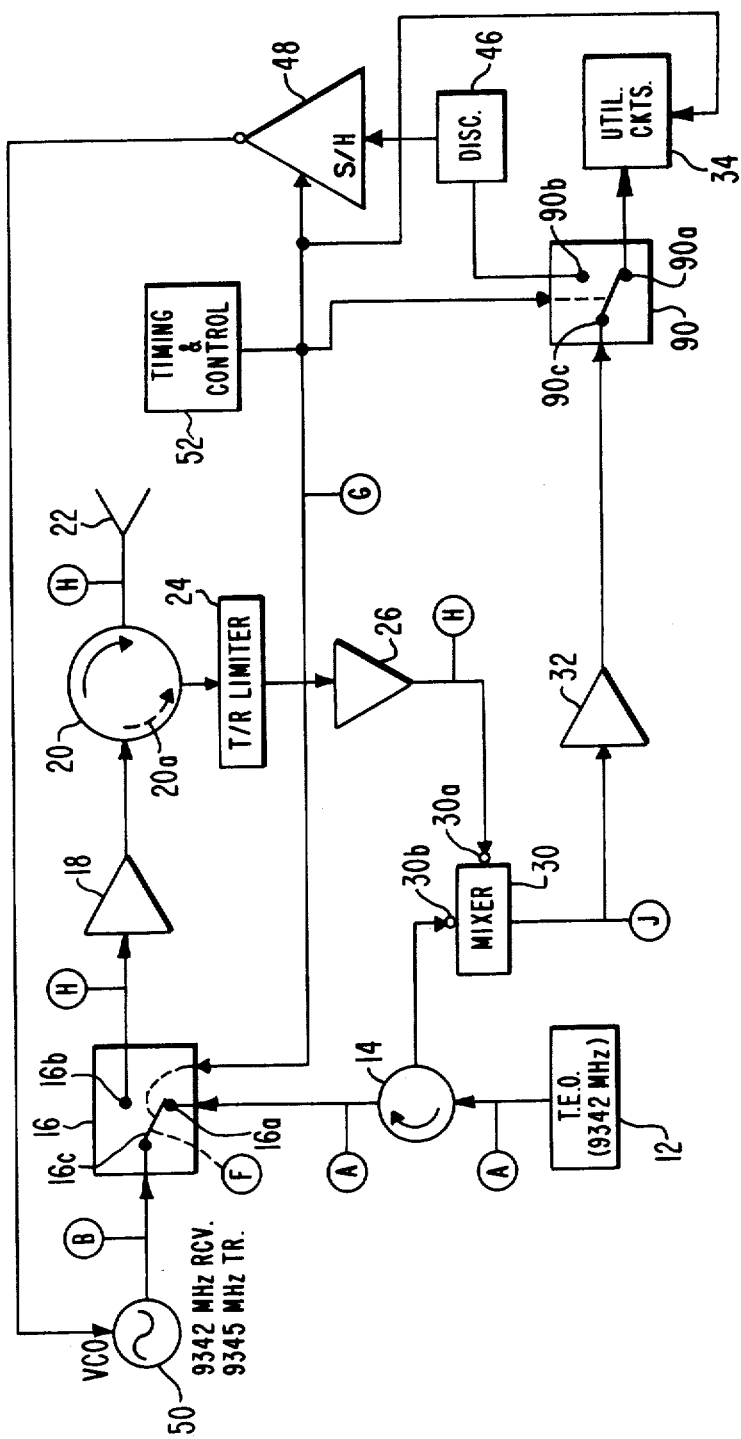
FIG. 2 is a second embodiment of the transmitting and receiving portion of a pulsed radar system in block diagram form including the transmitter oscillator circuitry.

It will be noted that mixer 42 and mixer 30 produce essentially the same signals although their output terminals are connected to different circuits. FIG. 2 is a circuit essentially identical to FIG. 1 except that mixer 42, couplers 40 and 43 and amplifier 44 and eliminated. An additional switch 90 similar to switch 16 is added. Amplifier 32 is connected to arm 90c rather than directly to circuit 34 which is connected to terminal 90a. Terminal 90b is connected to discriminator 46. Arm 90c is positioned under the control of T/C 52 to terminal 90a when arm 16c is connected to the terminal 16a and arm 90c is positioned under the control of T/C 52 to terminal 90b when switch arm 16c is positioned at terminal 16b. Thus, as illustrated in FIG. 2, a combination of mixer 30 and switch 90 accomplishes the function of mixers 30 and 42 in FIG. 1. It will be realized that during the transmit mode (i.e. when arm 16 is positioned to terminal 16b) the power supplied to terminal 30b of mixer 30 by relatively low power oscillator 17 is consequently low. However, since the total power gain of amplifiers 18 and 26 is sufficient to overcome the isolation of circulator 20 and provide ample power at terminal 30a of mixer 30 to allow proper operation of the mixer.

What is claimed is:

1. A pulsed radar oscillator comprising in combination:
    a first means producing a signal of a given radio frequency $f_1$;
    a second means normally adapted to produce a signal of a second different radio frequency $f_2$ but responsive to the application of said signal of frequency $f_1$ thereto for producing frequency $f_1$;
    means responsive to said second means for transmitting said frequency $f_2$ when produced thereby;
    means producing a succession of time spaced pulses of one value alternating with a succession of time spaced pulses of another value; and
    means responsive to said pulses of one value for applying said frequency $f_1$ to said second means and responsive to said pulses of another value for removing said frequency $f_1$ from said second means.

2. The combination as set forth in claim 1 further including a subtractive mixer responsive to said frequency $f_1$ from said first means and responsive to said frequency $f_2$ for producing the difference frequency thereof, said difference frequency being an intermediate frequency.

3. The combination as set forth in claim 2 wherein said second means is a voltage controlled oscillator.

4. The combination as set forth in claim 3 further including means responsive to said intermediate frequency for producing a control voltage which is a function of said intermediate frequency, said control voltage being applied to said voltage controlled oscillator to control the frequency thereof.

5. The combination as set forth in claim 4 wherein said mixer produces said intermediate frequency only when said second means is producing said frequency $f_2$ and further including means responsive to said means producing a succession of time spaced pulses and to said control voltage for sampling said control voltage when said pulses of another value are present and for storing said control voltage so sampled when said pulses of one value are present.

6. The combination of claim 1 wherein said first means is a transferred electron oscillator.

7. The combination of claim 1 wherein said means for transmitting said frequency $f_2$ comprises a radio frequency signal amplifier coupled to said second means for amplifying signals therefrom and a transmitting antenna for transmitting said amplified signals into the atmosphere.

8. The combination of claim 7 wherein said means responsive to said pulses is a switch means.

9. The combination of claim 8 wherein said switch means couples said first means to said second means only when said pulses of said one value are present and coupling said first means to said radio frequency signal amplifier only when said pulse of said another value are present.

10. The combination as set forth in claim 7 wherein said transmitting antenna is also a receiving antenna for receiving reflected signals of said frequency $f_2$ and further including a mixer receptive of said received signals of frequency $f_2$ and receptive of said frequency $f_1$ for producing a signal of frequency which is the difference of $f_1$ and $f_2$.

* * * * *